United States Patent
Gauss et al.

(10) Patent No.: US 7,607,532 B2
(45) Date of Patent: Oct. 27, 2009

(54) WORKPIECE SUPPORT DEVICE

(75) Inventors: Achim Gauss, Dornstetten/Hallwangen (DE); Peter Rathgeber, Dornstetten (DE)

(73) Assignee: Homag Holzbearbeitungssysteme AG, Schopfloch (DE)

(*) Notice: Subject to any disclaimer, the term of this patent is extended or adjusted under 35 U.S.C. 154(b) by 99 days.

(21) Appl. No.: 11/732,290

(22) Filed: Apr. 3, 2007

(65) Prior Publication Data

US 2007/0240829 A1 Oct. 18, 2007

(30) Foreign Application Priority Data

Apr. 4, 2006 (EP) .................... 06007098

(51) Int. Cl.
*B65G 15/14* (2006.01)
(52) U.S. Cl. .................. 198/626.3; 198/626.5; 198/847
(58) Field of Classification Search ............. 198/626.1, 198/626.3, 626.5, 626.6, 846, 847, 805, 811
See application file for complete search history.

(56) References Cited

U.S. PATENT DOCUMENTS

| | | | | |
|---|---|---|---|---|
| 3,915,291 A * | 10/1975 | Vogts | ........................ | 198/626.1 |
| 4,148,477 A * | 4/1979 | Larson | .................... | 198/626.1 |
| 5,036,970 A * | 8/1991 | Fastner | ........................ | 198/811 |
| 5,196,092 A * | 3/1993 | Stigberg | ...................... | 198/847 |
| 5,617,910 A | 4/1997 | Hill | | |
| 6,508,354 B2 * | 1/2003 | Breed et al. | ................. | 198/847 |
| 2004/0262131 A1 * | 12/2004 | Forster et al. | ............... | 198/805 |

FOREIGN PATENT DOCUMENTS

| | | |
|---|---|---|
| DE | 20107487 U | 10/2001 |
| DE | 10253097 | 12/2004 |
| EP | 1153714 | 11/2001 |
| WO | WO2004/113037 | 12/2004 |

\* cited by examiner

*Primary Examiner*—James R Bidwell
(74) *Attorney, Agent, or Firm*—Baker Botts L.L.P.

(57) ABSTRACT

The invention relates to a workpiece support device (10) for a continuously operating machine (1) for machining panel-shaped workpieces that are preferably made, at least in part, of wood, wood materials, or the like, the workpiece support device comprising at least one endlessly revolving belt (20) that is designed to support conveyed workpieces (2) at least sectionally, further comprising a stationary guide member (12) for the belt (20), the guide member having two deflection components (14) on which the belt is deflected. The workpiece support device in accordance with the invention is characterized in that the belt (20) comprises a plurality of layers extending in the belt's longitudinal direction, at least one of the layers being designed as a flexible layer which, at least in the belt's transverse direction, is less rigid than at least one of the other layers.

18 Claims, 3 Drawing Sheets

PRIOR ART

WORKPIECE SUPPORT DEVICE

CROSS-REFERENCE TO RELATED APPLICATIONS

This application claims priority to European patent application no. 06007098, filed Apr. 4, 2007, the disclosure of which is incorporated herein by reference in its entirety.

TECHNICAL FIELD

The invention relates to a workpiece support device for a continuously operating machine for machining panel-shaped workpieces that are preferably made, at least in part, of wood, wood materials or the like.

PRIOR ART

A device of the aforementioned type is known to the Applicant; this device is depicted in schematic form in FIG. 3 as a partial side view. FIG. 3 shows a continuously operating machine that is fitted with an overhead pressure means (workpiece support device) and a conveyor belt, between which a holding or conveying gap is defined for the panel-shaped workpieces that are to be machined. The pressure means has an endlessly revolving belt and a stationary guide means that has two deflection pulleys on which the belt is deflected. The belt is guided between the deflection pulleys by means of support rollers that are spring-mounted via pivoted levers in order to adapt the belt position to variable workpiece thicknesses or tolerances.

It has, however, been shown that the plurality of spring-mounted components makes it a comparatively complicated matter to design the known pressure means. What is more, movable components are constantly prone to dirt pickup, which is a drawback particularly if workpieces are being machined.

DESCRIPTION OF THE INVENTION

It is the object of the present invention to provide a workpiece support device of the aforementioned type, which device can be adapted to variable workpiece thicknesses or tolerances and yet which has a simple design and is less prone to dirt pickup.

In accordance with the invention, this problem is solved by a workpiece support device comprising the features of the instant invention. Particularly advantageous embodiments of the invention are described in the dependent claims.

The invention is based upon the idea of enabling the belt to be adapted to variable workpiece thicknesses or tolerances not (only) by means of intricate bearing structures, but as a result of the belt's actual design. For this purpose, the invention sees to it that the belt has a plurality of layers extending in the belt's longitudinal direction, at least one of these layers taking the form of a flexible layer which, at least in the belt's transverse direction, is less rigid than at least one of the other layers.

Thanks to its multi-layer structure that permits varying degrees of rigidity or flexibility, the belt can adapt readily to the particular dimensions of the workpieces, thereby making it possible to dispense, entirely if need be, with the belt's spring-mounted guide components. This greatly simplifies the structural design of the workpiece support device in accordance with the invention, whereas, at the same time, it is less prone to dirt pickup and is thus more durable. In addition, the transfer of force to the workpieces is obtained in a more uniform (less local) manner, thereby guiding the workpieces in a particularly stable way.

Within the scope of the present invention, a wide variety of materials can be used for the at least one flexible layer. In accordance with an embodiment of the present invention, however, it is envisaged that the at least one flexible layer includes a foamed material. As a result, the material's flexibility can be easily adapted to specific requirements. It has proved to be a particular advantage for a foamed plastic material to be used. In spite of their flexibility, such foamed materials are extremely tough and durable, making them ideal for use in the machining of panel-shaped workpieces.

Within the scope of the present invention, the absolute flexibility or rigidity of the at least one flexible layer is not subject to any particular restrictions, with it being possible to measure rigidity, for example, as the static modulus of elasticity as defined by German standard DIN 53515 under permanent static load.

What is more, the total flexibility of the at least one flexible layer can be controlled not just by the choice of material, but also by the material's dimensions. Against this background, an embodiment of the present invention specifies that the at least one flexible layer has a greater thickness than the other layers, i.e. than each of the other layers.

Although the at least one flexible layer can, in itself, be extremely durable and tough, it may make sense in certain applications to provide the at least one flexible layer with additional protection against damage. For this purpose, an embodiment of the invention specifies that the belt has at least one cover layer, in particular a film and/or casting skin. This can further boost the durability of the belt with minimum effort, without noticeably impairing its adaptability.

The other layers of the belt in the inventive workpiece support device might be formed, for example, by a conventional conveyor belt or toothed belt. In accordance with an embodiment of the invention, it is envisaged that the belt has at least one base belt comprising a material reinforced with cords in the belt's longitudinal direction, particularly comprising a rubber material. Such composite belts are extremely hard-wearing and durable and can be readily processed together with the aforementioned flexible layer.

In principle, the belt can be guided on the guide device in a wide variety of ways, it being possible, in addition, to form the guide device, in certain circumstances, simply by means of two or more deflection members such as deflection pulleys. Particularly in the case of elongated workpiece support devices, however, it has proved advantageous for additional guide mechanisms that stabilize the belt to be provided between the deflection members. An further embodiment of the invention envisages that the guide device has a guide rail with a that offers form-locked adaptation to the respective belt and that has a base in which are arranged air outlet openings connected to a compressed-air source. This makes it possible to almost completely eliminate frictional forces between the belt and guide device, thereby permitting extremely high rotational belt speeds. One result is that the workpiece support device can be used for example in continuously operating machines that have a conveying speed of up to 200 m/min or more.

Such a continuously operating machine define particularly advantageous applications of the workpiece support device in accordance with the invention. An extremely wide range of structural designs can be used for the conveying device, such as conventional belt conveyors or chain conveyors, whereby the belts can slide for example on an air cushion, or the chains can be guided for example with the assistance of magnetic forces. Likewise, within the scope of the present invention, the conveying device can simply be designed as a sliding means with a sliding surface in which air outlet openings are arranged at least sectionally, it being possible in this case to drive the belt of the workpiece support device.

DETAILED DESCRIPTION OF PREFERRED EMBODIMENTS

There now follows a detailed description of various preferred embodiments of the present invention, in which reference will be made to the accompanying drawings.

Figure 1:
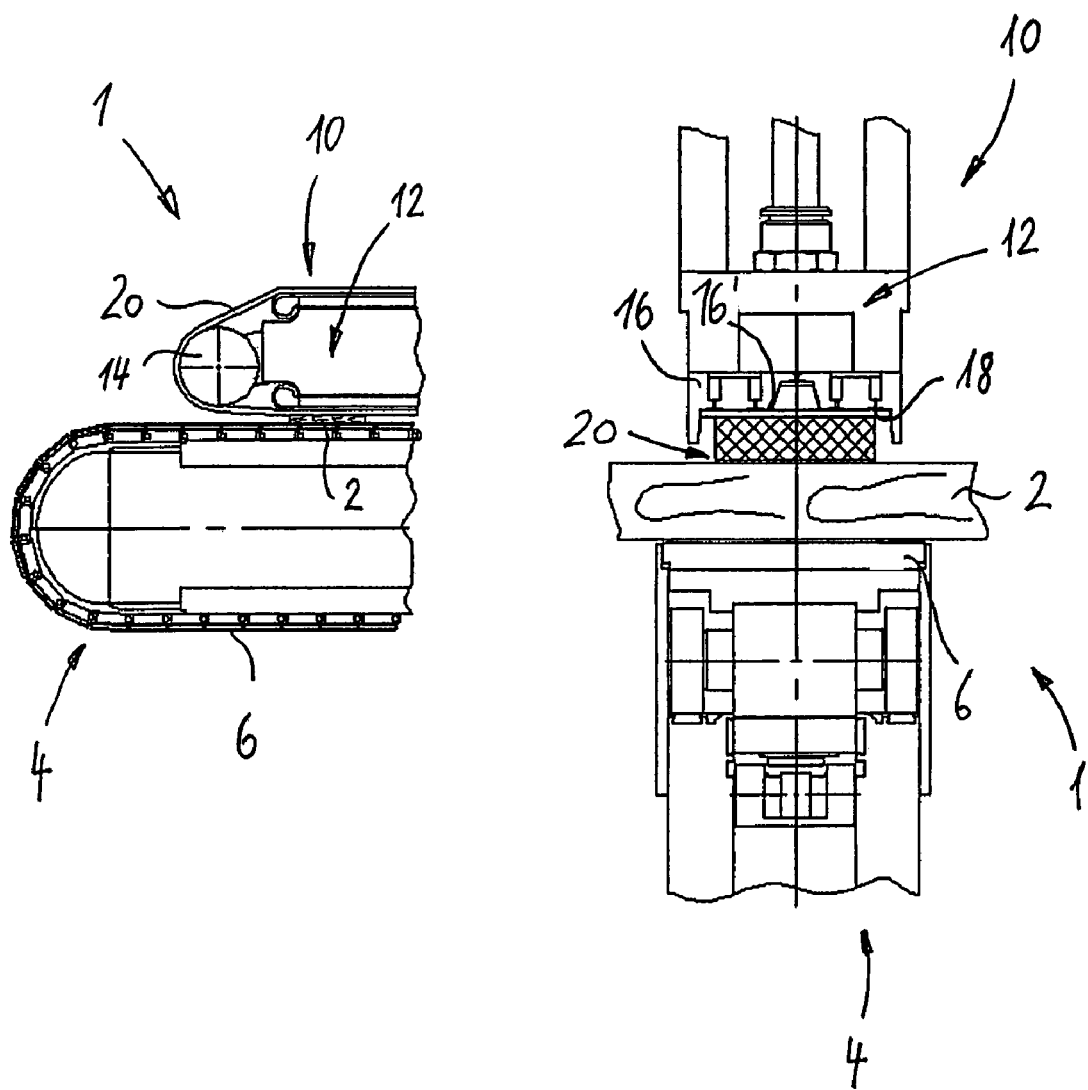
FIG. 1 is a schematic depiction of a side view of, and a sectional view through, a continuously operating machine as a preferred embodiment of the present invention.

A continuously operating machine 1 having a workpiece support device 10 as a preferred embodiment of the present invention is shown in schematic form in FIG. 1 as a side view and as a sectional view. The continuously operating machine 1 is used to machine panel-shaped workpieces 2 that are made, for example, at least in part, of wood, wood materials, plastics, other composites or the like and are used in furniture construction and fitted kitchens.

In the present embodiment, the workpiece support device 10 is designed as an overhead pressure means, but the workpiece support device can in principle assume any position and can itself be used as a conveying device too, for example in combination with a known or inventive overhead pressure means. The workpiece support device 10 has a guide means 12 comprising two deflection pulleys 14 (just one of which is shown in FIG. 1), around which a belt 20 is guided in an endlessly revolving manner.

Figure 2:
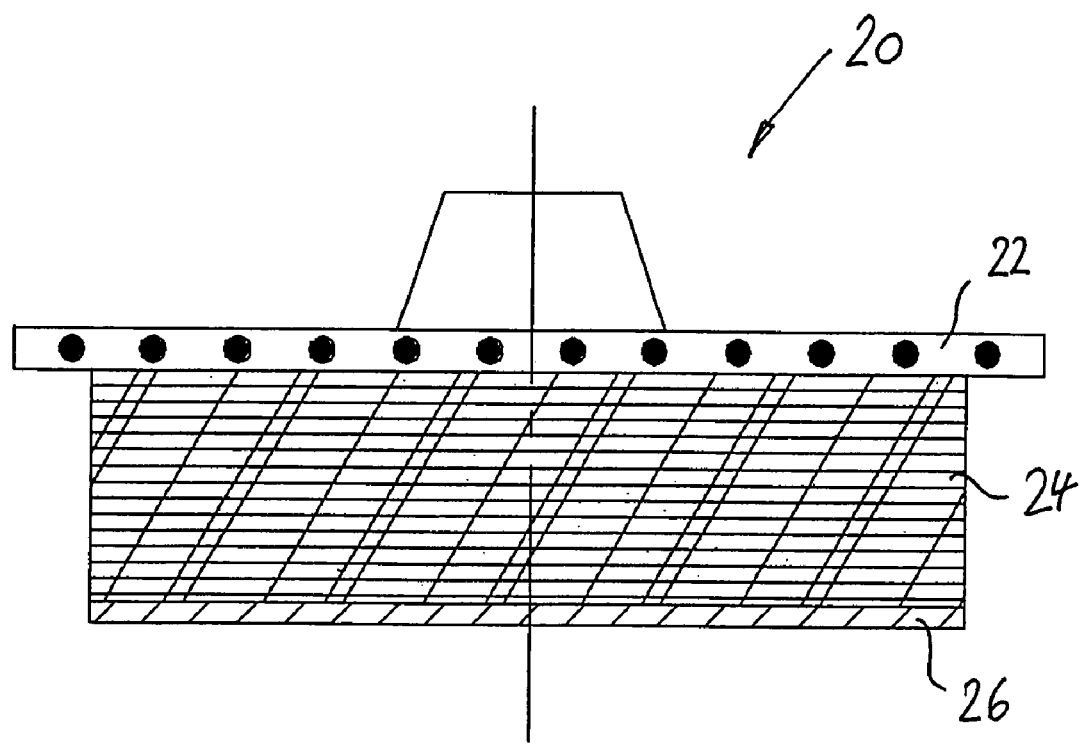
FIG. 2 is a schematic depiction of a sectional view of the belt of the continuously operating machine shown in FIG. 1.
Figure 3:
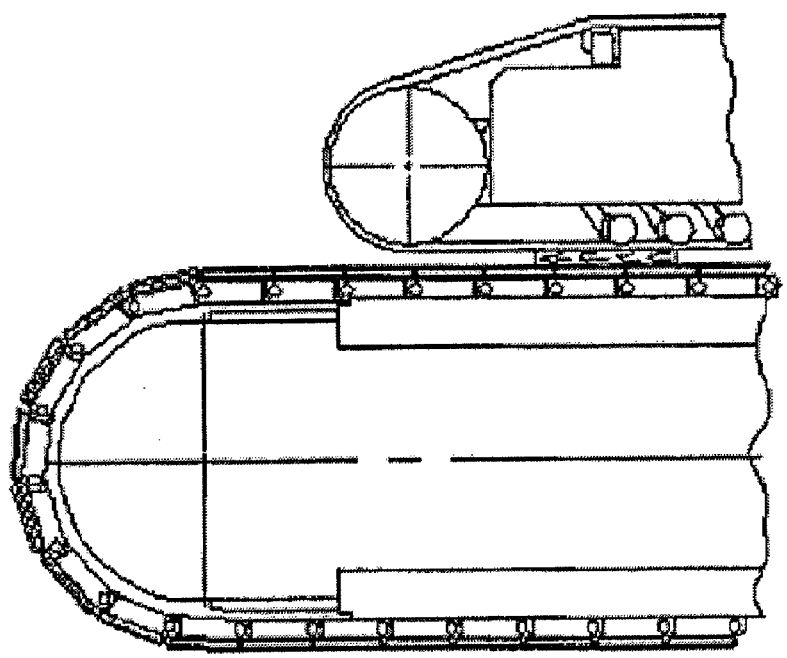
FIG. 3 is a schematic depiction of a side view of a known continuously operating machine.

As is best identifiable in FIG. 2, the belt 20 in the present embodiment has three layers 22, 24, 26 extending in the belt's longitudinal direction (orthogonal relative to the plane of projection in FIG. 2). Of these layers, the central layer 24 is designed to be the flexible layer in the present embodiment; in the belt's transverse direction (i.e. at least from top to bottom in FIG. 2), the layer 24 is less rigid than at least the upper layer 22, which will be discussed in further detail below.

In the present embodiment, the flexible layer 24 is formed by a foamed material, to be precise a plastic foam. As can be identified in FIG. 2, the flexible layer 24 is much thicker (as measured from top to bottom in FIG. 2) than the other two layers 22 and 26.

Additionally, a cover layer 26 that is formed by a film in the present embodiment, but which may also take a different form, such as a casting skin, is provided on that side of the flexible layer 24 which faces toward the workpiece 2.

In addition, a base belt 22 which comprises a rubber material that is reinforced with cords in the belt's longitudinal direction (orthogonal relative to the plane of projection in FIG. 2), as is known in the field of toothed belts, is provided on that side of the flexible layer 24 which faces away from the workpiece 2.

In the present embodiment, the guide means 12 has, in addition to the deflection pulleys 14, a groove 16 in which the belt 20 is guided in form-locked fashion. In this embodiment, the base 16' of the groove is provided with air outlet openings 18 that can communicate with a compressed-air source. In this way, an air cushion can be produced between the base 16' and the groove 16 and belt 20, thereby reducing or virtually eliminating friction in this region.

In addition, a conveying means 4 that has an endlessly revolving conveyor chain 6 in the present embodiment is provided beneath the workpiece support device 10. A conveying gap through which the panel-shaped workpieces 2 are passed is defined between the conveyor chain 6 and conveyor belt 20. The panel-shaped workpieces 2 are conveyed past machine tools or machining assemblies that are not shown in further detail here.

As a result of the flexible design of the belt 20, panel-shaped workpieces with variable dimensions or tolerances can be conveyed easily without entailing any complicated mechanisms or adjustment work.

The invention claimed is:

1. A continuously operating machine for machining panel-shaped workpieces that are preferably made, at least in part, of wood or wood materials, said continuously operating machine comprising:
   at least one endlessly revolving belt designed to support conveyed workpieces at least sectionally, and
   a stationary guide member for said belt, said guide member having at least two deflection components on which said belt is deflected, and
   wherein said belt has a plurality of layers extending in the belt's longitudinal direction, at least one of said layers being designed as a flexible layer which, at least in the belt's transverse direction, is less rigid than at least one of the other layers,
   a conveyor having an endlessly revolving conveying member or a sliding surface, a conveying gap for holding and conveying said panel-shaped workpieces being formed between said endlessly revolving conveying member or said sliding surface and the belt, and
   wherein at least one machine tool or machining assembly is arranged in the region of said conveying gap.

2. The continuously operating machine in accordance with claim 1, characterized in that said at least one flexible layer comprises a foamed material, preferably a foamed plastic material.

3. The continuously operating machine in accordance with claim 1, wherein said at least one flexible layer is thicker than said other layers.

4. The continuously operating machine in accordance with claim 1, wherein said belt comprises at least one cover layer, or a casting skin.

5. The continuously operating machine in accordance with claim 1, wherein said belt comprises at least one base belt made of a material reinforced with cords in the belt's longitudinal direction, said belt being made in particular of a rubber material.

6. The continuously operating machine in accordance with claim 1, wherein said guide member comprises a guide rail having a groove that offers form-locked adaptation to the respective belt, said groove having a base in which are arranged air outlet openings that can communicate with a compressed-air source.

7. The continuously operating machine in accordance with claim 1, wherein said conveyor comprises a conveying member that is guided, at least sectionally, on an air cushion.

8. The continuously operating machine in accordance with claim 1, wherein said conveyor comprises a conveying member that is guided, at least sectionally, as a result of magnetic forces.

9. The continuously operating machine in accordance with claim 1, wherein said conveyor comprises a sliding surface in which air outlet openings are arranged at least sectionally, it being possible to drive said belt of said workpiece support device.

10. A workpiece support device for a continuously operating machine for machining panel-shaped workpieces, said workpiece support device comprising:
- at least one endlessly revolving belt designed to support at least a portion of said conveyed workpieces, and
- a stationary guide member, said guide member having at least two deflection components on which said belt is deflected,
- wherein said belt has first and third opposing layers with a second layer disposed between said first and third layers, wherein said second layer is less rigid than at least one of the other layers.

11. The workpiece support device in accordance with claim 10, wherein said second layer comprises a foamed material.

12. The workpiece support device in accordance with claim 10, wherein said second layer is thicker than said other layers.

13. The workpiece support device in accordance with claim 10, wherein said first layer is a base belt made of a material reinforced with cords extending in the belt's longitudinal direction, said belt being made of a rubber material.

14. The workpiece support device in accordance with claim 10, wherein said guide member comprises a guide rail having a groove that provides a form-locked adaptation to said belt, said groove having a base including air outlet openings in communication with a compressed-air source.

15. The workpiece support device in accordance with claim 10, further comprising an endlessly revolving conveying member, a conveying gap for holding and conveying said panel-shaped workpieces being formed between said endlessly revolving conveying member and said belt.

16. The workpiece support device in accordance with claim 15, wherein at least a portion of said conveying member is guided on an air cushion.

17. The workpiece support device in accordance with claim 15, wherein at least a portion of said conveying member is guided by magnetic forces.

18. The workpiece support device in accordance with claim 15, wherein said conveying member includes a sliding surface in which air outlet openings are arranged to drive said belt of said workpiece support device.

\* \* \* \* \*